United States Patent
Shimada et al.

(10) Patent No.: US 11,494,132 B2
(45) Date of Patent: Nov. 8, 2022

(54) COMMUNICATION DEVICE

(71) Applicant: Brother Kogyo Kabushiki Kaisha, Nagoya (JP)

(72) Inventors: Yusuke Shimada, Owariasahi (JP); Hirotaka Asakura, Nagoya (JP); Hiroshi Shibata, Obu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 47 days.

(21) Appl. No.: 15/904,514

(22) Filed: Feb. 26, 2018

(65) Prior Publication Data

US 2018/0248697 A1   Aug. 30, 2018

(30) Foreign Application Priority Data

Feb. 28, 2017   (JP) .............................. JP2017-037474

(51) Int. Cl.
*G06F 3/12* (2006.01)
*H04L 9/32* (2006.01)
(Continued)

(52) U.S. Cl.
CPC .......... *G06F 3/1204* (2013.01); *G06F 3/1236* (2013.01); *G06F 3/1292* (2013.01);
(Continued)

(58) Field of Classification Search
CPC ...... H04L 9/321; H04W 48/20; H04W 76/10; H04W 12/06; H04W 84/12; G06F 3/1204; G06F 3/1236; G06F 3/1292
(Continued)

(56) References Cited

U.S. PATENT DOCUMENTS 8,693,038 B2 *   4/2014   Suzuki .................. H04W 12/06
                                                           358/1.15
9,848,062 B2   12/2017   Nogawa
(Continued)

FOREIGN PATENT DOCUMENTS

EP   2645775 A2 *  10/2013   .............. H04W 4/80
JP   2016-052097 A    4/2016
JP   2017-017601 A    1/2017

OTHER PUBLICATIONS

Tata, Chafika, and Michel Kadoch. "Multipath routing algorithm for device-to-device communications for public safety over LTE heterogeneous networks." In 2014 1st International conference on information and communication technologies for disaster management (ICT-DM), pp. 1-7. IEEE, 2014. (Year: 2014).*

(Continued)

*Primary Examiner* — Oscar A Louie
*Assistant Examiner* — Melaku Y Habtemariam
(74) *Attorney, Agent, or Firm* — Banner & Witcoff, Ltd.

(57) ABSTRACT

A communication device may establish a first wireless connection with a first external device, and receive target wireless setting information from the first external device by using the first wireless connection, the target wireless setting information being for participating as a child station in a target wireless network formed by a target access point different from the first external device. The communication device may control a display unit to display a predetermined screen for accepting a trigger operation, the trigger operation being a trigger of participation in the target wireless network, and establish a target wireless connection with the target access point by using the target wireless setting information so as to participate as the child station in the target wireless network, in a case where the trigger operation
(Continued)

is accepted after the predetermined screen has been displayed.

15 Claims, 8 Drawing Sheets

(51) Int. Cl.
    *H04W 12/06*    (2021.01)
    *H04W 76/10*    (2018.01)
    *H04W 84/12*    (2009.01)
    *H04W 48/20*    (2009.01)

(52) U.S. Cl.
    CPC ............ *H04L 9/321* (2013.01); *H04W 12/06* (2013.01); *H04W 48/20* (2013.01); *H04W 76/10* (2018.02); *H04W 84/12* (2013.01)

(58) Field of Classification Search
    USPC .......................................... 709/225–227, 217
    See application file for complete search history.

(56) References Cited

U.S. PATENT DOCUMENTS

| | | | | |
|---|---|---|---|---|
| 2010/0036855 | A1* | 2/2010 | Sasaki | G06F 16/95 715/739 |
| 2012/0322391 | A1* | 12/2012 | Suzuki | H04W 12/003 455/68 |
| 2013/0081121 | A1 | 3/2013 | Green et al. | |
| 2013/0260683 | A1* | 10/2013 | Suzuki | H04W 76/10 455/41.1 |
| 2013/0260818 | A1* | 10/2013 | Suzuki | H04W 76/16 455/552.1 |
| 2013/0309968 | A1* | 11/2013 | Suzuki | H04W 4/80 455/41.1 |
| 2014/0355047 | A1* | 12/2014 | Lee | G06F 3/1292 358/1.15 |
| 2015/0092607 | A1* | 4/2015 | Ando | H04L 41/0893 370/255 |
| 2015/0093992 | A1* | 4/2015 | Tanaka | H04B 5/0031 455/41.2 |
| 2015/0193183 | A1* | 7/2015 | Ichikawa | H04N 1/32795 358/1.15 |
| 2015/0324156 | A1* | 11/2015 | Asai | H04W 4/80 358/1.15 |
| 2016/0066359 | A1* | 3/2016 | Nogawa | H04L 67/36 370/329 |
| 2017/0005876 | A1 | 1/2017 | Shibata | |

OTHER PUBLICATIONS

Campos, Rui, Ricardo Duarte, Filipe Sousa, Manuel Ricardo, and José Ruela. "Network infrastructure extension using 802.1 D-based wireless mesh networks." Wireless Communications and Mobile Computing 11, No. 1 (2011): 67-89. (Year: 2011).*

Wi-Fi Alliance Technical Committee P2P Task Group, "Wi-Fi Peer-to Peer (P2P) Technical Specification", Version 1.5, pp. 1-183, 2014.

* cited by examiner

FIG. 3

| Activation Condition | | SSID | Authentication scheme Encryption scheme | Password | IP Address | Open Port | Upper Limit of the Number of Child Stations |
|---|---|---|---|---|---|---|---|
| SoftAP | Setting Mode | Fixed Value (Setupprinter10) | OPEN NONE | NONE | Fixed Value (192.168.0.1) | 443 | 1 |
| G/O | G/O Activating Operation | Generate Every Activation | WPA2-PSK TKIP | Generate Every Activation | Determine Every Activation (192.168.0.1 is ineffective) | 22 80 443 ... | 4 |

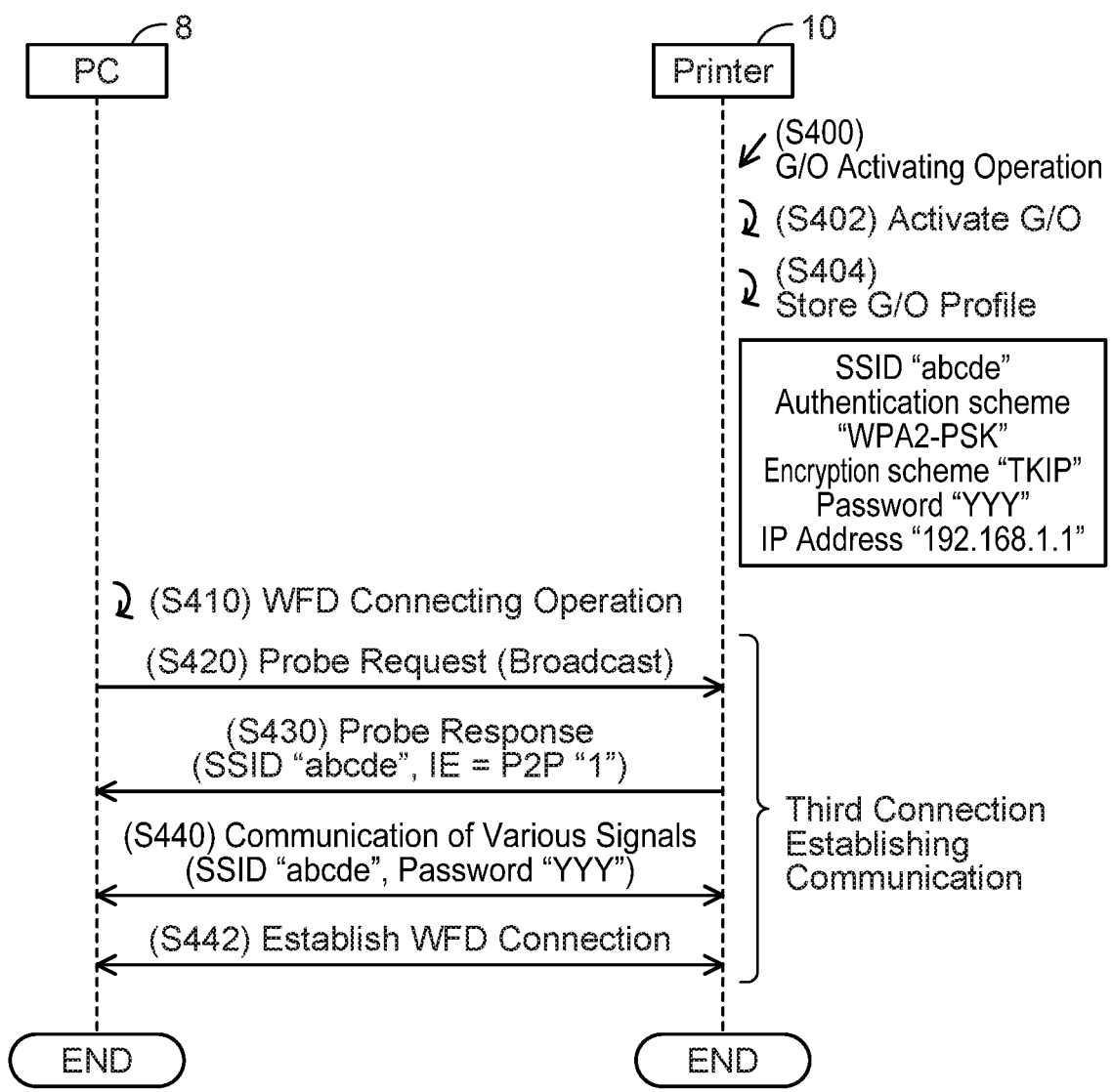

COMMUNICATION DEVICE

TECHNICAL FIELD

The teachings herein disclose a communication device capable of establishing a wireless connection with an access point.

BACKGROUND ART

A host device acquires an instruction set from a server through a link, and uses the instruction set to send wireless authentication information to a peripheral device for establishing a wireless connection with an access point. As a result, the peripheral device can establish the wireless connection with the access point using the wireless authentication information.

SUMMARY

According to the above configuration, a third party who is not a user of the peripheral device may be able to establish a wireless connection between the peripheral device and an access point using the third party's device, without being close to the peripheral device.

The teachings herein provide a technique that may prevent a third party who is not a user of a communication device from establishing a wireless connection with an access point that the user does not intend.

A communication device disclosed herein may comprise: a display unit; a wireless interface; a processor; and a memory storing computer-readable instructions therein, the computer-readable instructions, when executed by the processor, causing the communication device to: establish a first wireless connection with a first external device via the wireless interface; in a case where the first wireless connection is established, receive target wireless setting information from the first external device via the wireless interface by using the first wireless connection, the target wireless setting information being for participating as a child station in a target wireless network formed by a target access point different from the first external device; in a case where the first wireless connection is established, control the display unit to display a predetermined screen for accepting a trigger operation, the trigger operation being a trigger of participation in the target wireless network; and in a case where the trigger operation is accepted after the predetermined screen has been displayed, establish a target wireless connection with the target access point via the wireless interface by using the target wireless setting information so as to participate as the child station in the target wireless network.

A communication device disclosed herein may comprise: a wireless interface; a processor; and a memory storing computer-readable instructions therein, the computer-readable instructions, when executed by the processor, causing the communication device to: establish a first wireless connection with a first external device via the wireless interface so as to cause the first external device to participate as a child station in a first wireless network in which the communication device operates as a parent station, the first wireless network being identified by a first network identifier; determine a predetermined first IP address as an IP address of the communication device in the first wireless network; receive target wireless setting information, in which the first IP address is designated as destination, from the first external device via the wireless interface by using the first wireless network, the target wireless setting information being for participating as a child station in a target wireless network formed by a target access point different from the first external device; in a case where the target wireless setting information in which the first IP address is designated as destination is received, establish a target wireless connection with the target access point via the wireless interface by using the target wireless setting information, so as to participate as a child station in the target wireless network; establish a second wireless connection with a second external device via the wireless interface so as to cause the second external device to participate as a child station in a second wireless network in which the communication device operates as a parent station, the second wireless network being identified by a second network identifier different from the first network identifier; and determine a second IP address as an IP address of the communication device in the second wireless network, the second IP address being different from the first IP address.

A control method and computer-readable instructions for implementation of the communication device described above, and a non-transitory computer-readable recording medium in which the computer-readable instructions are stored, are also novel and useful. Further, a communication system including the communication device and the external device is also novel and useful.

BRIEF DESCRIPTION OF THE DRAWINGS

FIG. 3 shows a table for comparing SoftAP and GroupOwner realized by the printer.

FIG. 8 shows a sequence diagram showing processes by which the printer operating as the GroupOwner establishes a Wi-Fi connection with a PC.

EMBODIMENTS (System Configuration; FIG. 1)

As shown in FIG. 1, a communication system 2 includes a printer 10, a mobile terminal 100, a server 200, and a PC 8. The mobile terminal 100 already has a Wi-Fi connection with an access point (hereinbelow termed "AP" (abbreviation for Access Point)) 6 established. Since the AP 6 is connected to the Internet 4, the mobile terminal 100 can execute communication with the server 200 on the Internet 4 through the AP 6.

Figure 1:
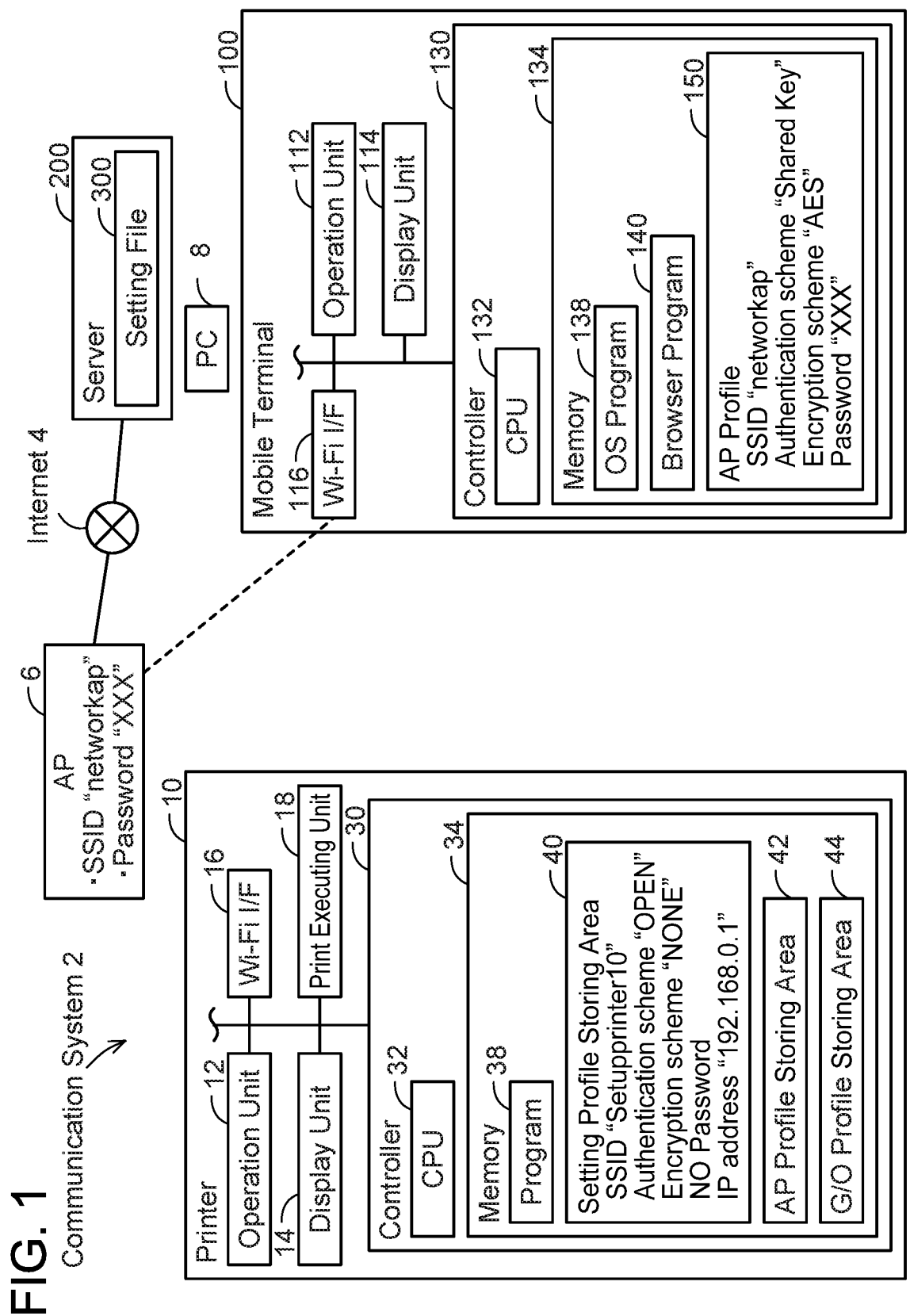
FIG. 1 shows a configuration of a communication system.

The printer 10 operates as a SoftAP (abbreviation of Software Access Point) to establish a Wi-Fi connection with the mobile terminal 100. In this case, the printer 10 uses the Wi-Fi connection to receive wireless setting information from the mobile terminal 100 for establishing a Wi-Fi connection with the AP 6, and then establishes the Wi-Fi connection with the AP 6. Further, the printer 10 is also capable of operating as a GroupOwner (hereafter termed "G/O") of a WFD (abbreviation of Wi-Fi Direct (registered trademark)) to establish a Wi-Fi connection with the PC 8.

(Configuration of Printer 10)

The printer 10 includes an operation unit 12, a display unit 14, a Wi-Fi interface 16, a print executing unit 18, and a controller 30. Respective units 12 to 30 are connected to a bus line (reference sign not given). Hereinbelow, the interface will be termed "I/F". The operation unit 12 includes a plurality of keys, and is configured to accept user operations. The display unit 14 is a display for displaying various types of information. The print executing unit 18 includes an ink jet type or laser type print mechanism.

The Wi-Fi I/F 16 is an I/F for executing a wireless communication according to a Wi-Fi scheme (hereinbelow termed "Wi-Fi communication"). The Wi-Fi scheme is a wireless communication scheme complying with the standard established by the Wi-Fi Alliance, and is a wireless communication scheme based for example on the standard of 802.11 of the IEEE (abbreviation of the Institute of Electrical and Electronics Engineers, Inc.), or other relevant standards (such as 802.11a, 11b, 11g, 11n, etc.) thereof. The Wi-Fi I/F 16 supports a SoftAP function. The Wi-Fi I/F 16 is capable of simultaneous execution of a wireless communication according to the SoftAP function (i.e., a wireless communication not using the AP 6), and a wireless communication using the AP 6. Further, the Wi-Fi I/F 16 supports a WFD function defined by the Wi-Fi Alliance. The WFD is a wireless communication scheme described in the standard of "Wi-Fi Peer-to-Peer (P2P) Technical Specification Version 1.5" published by the Wi-Fi Alliance.

The controller 30 includes a CPU 32 and a memory 34. The CPU 32 executes various processes according to a program 38 stored in the memory 34. The memory 34 is configured of a ROM, a RAM, and the like. Further, the memory 34 includes a setting profile storing area 40, an AP profile storing area 42, and a G/O profile storing area 44.

The setting profile storing area 40 is an area for storing a setting profile, which is wireless setting information used in a wireless network created by the printer 10 operating as the SoftAP (which is hereafter termed "SoftAP NW"). The setting profile may be stored in advance in the storing area 40 before the printer 10 is shipped, or may for example be installed in the storing area 40 from a server on the Internet after the printer 10 had been shipped. The setting profile includes an SSID (abbreviation of Service Set Identifier) "setupprinter10". This SSID is an identifier for identifying the SoftAP NW. The setting profile further includes "OPEN" as its authentication scheme, and includes "NONE" as its encryption scheme. As above, since the authentication scheme is "OPEN", no authentication is executed on the SoftAP NW, and since the encryption scheme is "NONE", no encryption communication is executed on the SoftAP NW. Thus, the setting profile does not include a password that would be required for authentication and encryption communication. Further, the setting profile includes an IP address "192.168.0.1" of the printer 10 in the SoftAP NW.

The AP profile storing area 42 is an area for storing an AP profile, which is wireless setting information used in a wireless network created by the AP 6 (which is hereafter termed "normal AP NW"). The AP profile is not stored in the storing area 42 at the time of shipping the printer 10. The AP profile is stored in the storing area 42 when the Wi-Fi connection with the AP 6 is established.

The G/O profile storing area 44 is an area for storing a G/O profile, which is wireless setting information used in a wireless network created by the printer 10 operating as the G/O in the WFD scheme (which is hereafter termed "WFD NW"). The G/O profile is not stored in the storing area 44 at the time of shipping the printer 10. The G/O profile is stored in the storing area 44 when the printer 10 starts its operation as the G/O.

(Configuration of Mobile Terminal 100)

The mobile terminal 100 is a carriable terminal device, such as a cell phone (e.g., a smart phone), a PDA, a laptop PC, a tablet PC, a mobile music player, a mobile movie player, and the like. However, in a variant, a stationary terminal device (e.g., a desktop PC) may be used instead of the mobile terminal 100. The mobile terminal 100 includes an operation unit 112, a display unit 114, a Wi-Fi I/F 116, and a controller 130. The respective units 112 to 130 are connected to a bus line (reference sign not given).

The operation unit 112 includes a plurality of keys. A user can input various instructions to the mobile terminal 100 by operating the operation unit 112. The display unit 114 is a display for displaying various types of information. The display unit 114 functions also as a so-called touch panel (i.e., it functions as an operation unit as well).

The Wi-Fi I/F 116 is an I/F for executing a Wi-Fi communication. The Wi-Fi I/F 116 may or may not support the SoftAP function and the WFD function. The Wi-Fi I/F 116 establishes the Wi-Fi connection with the AP 6, as a result of which the mobile terminal 100 participates in the normal AP NW.

The controller 130 includes a CPU 132 and a memory 134. The CPU 132 executes various processes according to programs 138, 140 stored in the memory 134. The memory 134 is configured of a volatile memory, a non-volatile memory, and the like. The memory 134 stores not only the OS program 138 for implementing basic operation of the mobile terminal 100, but also the browser program 140. The browser program 140 is general-purpose data browsing software, such as IE (abbreviation of Internet Explorer (registered trademark)), Safari (registered trademark), GoogleChrome (registered trademark), and the like. Further, the memory 134 stores the AP profile 150 (i.e., the SSID "networkap", the password "XXX", etc.) used in the normal AP NW. The AP profile has a higher security level than the authentication scheme "OPEN" and the encryption scheme "NONE" used in the aforementioned SoftAP NW. For example, an authentication scheme in which authentication is executed, such as "Shared Key", "WPA-EAP", and the like is employed. Further, for example, an encryption scheme in which encryption communication is executed, such as "AES", "TKIP", and the like is employed.

(Configuration of Server 200)

The server 200 is installed on the Internet 4 by a vendor of the printer 10. The server 200 stores a setting file 300 (see FIG. 6) to be installed to the mobile terminal 100.

The setting file 300 includes various commands for sending the AP profile used in the normal AP NW from the mobile terminal 100 to the printer 10 to establish a Wi-Fi connection between the printer 10 and the AP 6. Especially, the setting file 300 is described in a markup language that the browser program 140 of the mobile terminal 100 can interpret, and in this embodiment, this language is HTML (abbreviation of Hyper Text Markup Language). However, in a variant, this language may be other language such as XML (abbreviation of eXtensible Markup Language) or the like. Further, commands in the setting file 300 are described according to JavaScript (registered trademark).

(Configuration of PC 8)

The PC 8 is a stationary device such as a desktop PC. However, in a variant, a carriable device such as a laptop PC, a tablet PC, and the like may be used instead of the PC 8.

Figure 2:
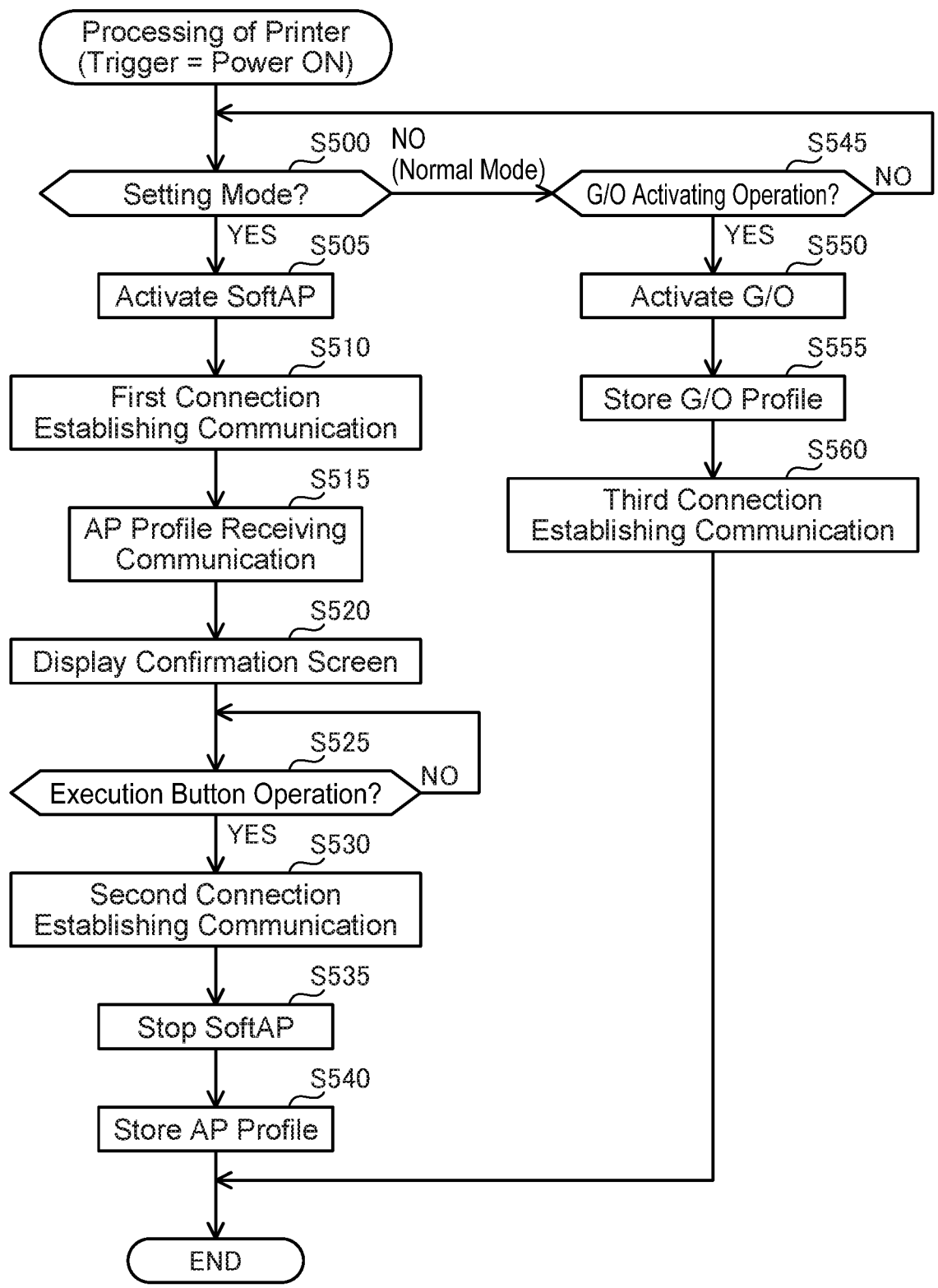
FIG. 2 shows a flow chart of processes by a printer.

(Processes of Printer 10; FIG. 2)

Next, with reference to FIG. 2, processes executed by the CPU 32 of the printer 10 will be described. In this embodiment, a situation is assumed in which the user has newly purchased the printer 10, and wishes to establish the Wi-Fi connection between the printer 10 and the AP 6, which is installed in user's house or workplace. When power-on operation is performed by the user, the CPU 32 executes the processes of FIG. 2. Further, all communications hereinbelow are executed through the Wi-Fi I/F 16, and as such, the clear indication of the communication being executed "through the Wi-Fi I/F 16" will be omitted.

In S500, the CPU 32 determines whether or not an operation mode of the printer 10 is in a setting mode. Here, the printer 10 is capable of operating in either the setting mode or a normal mode. The setting mode is a mode for the printer 10 to establish the Wi-Fi connection with the AP 6. In a state prior to the printer 10 establishing the Wi-Fi connection with the AP 6, that is, in a state where no AP profile is stored in the AP profile storing area 42, the printer 10 operates in the setting mode. On the other hand, in a state after the printer 10 has established the Wi-Fi connection with the AP 6, that is, in a state where an AP profile is stored in the AP profile storing area 42, the printer 10 operates in the normal mode. If a determination is made that the operation mode of the printer 10 is the setting mode (YES to S500), the CPU 32 proceeds to S505, and if a determination is made that the operation mode of the printer 10 is the normal mode (NO to S500), the CPU 32 proceeds to S545.

In S505, the CPU 32 activates the SoftAP to create a SoftAP NW in which the printer 10 operates as a parent station. At this stage, only the printer 10 belongs to the SoftAP NW as the parent station. The CPU 32 determines respective setting values to be employed by the printer 10 operating as the SoftAP.

With reference to FIG. 3, the respective setting values will be described. The CPU 32 reads the setting profile from the setting profile storing area 40, and determines this setting profile as the wireless setting information that should be used in the SoftAP NW. That is, the CPU 32 determines "Setupprinter10" as an SSID for identifying the SoftAP NW, and determines an authentication scheme "OPEN" and an encryption scheme "NONE" as security information that should be used in the SoftAP NW. The CPU 32 does not determine a password should be used in the SoftAP NW.

Further, the CPU 32 determines an IP address "192.168.0.1", which is a fixed value, included in the setting profile as the IP address of the printer 10 in the SoftAP NW. Further, the CPU 32 opens only one communication port identified by a port number "443". Here, the communication port identified by the port number "443" is a communication port for executing communications according to HTTPS (abbreviation of Hyper Text Transfer Protocol Secure). Further, the CPU 32 determines "1" as an upper limit of a number of child stations that can participate in the SoftAP NW.

In S510, the CPU 32 executes a first connection establishing communication with the mobile terminal 100 for establishing a Wi-Fi connection with the mobile terminal 100. The first connection establishing communication includes receiving a probe request from the mobile terminal 100 and sending a probe response to the mobile terminal 100. Here, the CPU 32 writes the SSID "Setupprinter10", determined in S505, within the probe response. Due to this, the mobile terminal 100 can be notified of the fact that the printer 10 is operating as the parent station of the SoftAP NW identified by the SSID "Setupprinter10". The CPU 32 further writes "0" in a P2P GroupOwner bit in an IE (abbreviation of Information Element) included in the probe response. This bit is an area where a value indicating whether or not a wireless communication according to the WFD scheme is executable is to be written. The bit describing "0" indicates that the wireless communication according to the WFD scheme is not executable. The bit describing "1" indicates that the wireless communication according to the WFD scheme is executable. In S510, since the printer 10 is not operating as the G/O of the WFD scheme, "0" is written in this bit. Due to this, the mobile terminal 100 can be notified that a Wi-Fi connection according to a normal Wi-Fi scheme should be established instead of the Wi-Fi connection according to the WFD scheme. The first connection establishing communication further includes communications of respective signals (such as an Authentication signal, an Association signal, and a 4-way handshake, etc.). Due to this, the CPU 32 establishes the Wi-Fi connection with the mobile terminal 100 and causes the mobile terminal 100 to participate in the SoftAP NW as a child station. As determined in S505, the SoftAP NW employs the authentication scheme "OPEN" and the encryption scheme "NONE", and no password is used therein. Due to this, the user of the mobile terminal 100 can easily cause the mobile terminal 100 to participate in the SoftAP NW without having have to input any password to the mobile terminal 100.

In S515, the CPU 32 uses the Wi-Fi connection established in S510, that is, by using the SoftAP NW, to execute an AP profile receiving communication with the mobile terminal 100 for receiving the AP profile from the mobile terminal 100. Due to this, the CPU 32 receives, from the mobile terminal 100, an AP profile 150 that designates the IP address "192.168.0.1" of the printer 10 determined in S505 as destination. More specifically, the CPU 32 does not receive all information included in the AP profile 150; instead, it receives the SSID "networkap" and the password "XXX".

In S520, the CPU 32 displays a confirmation screen on the display unit 14. The confirmation screen is a screen for accepting an execution button operation, which is a trigger for bringing the printer 10 to participate in a normal AP NW.

In S525, the CPU 32 monitors for user's operation on the execution button within the confirmation screen displayed in S520. The CPU 32 proceeds to S530 when the execution button is operated (YES to S525).

In S530, the CPU 32 executes a second connection establishing communication with the AP 6 for establishing the Wi-Fi connection with the AP 6. The second connection establishing communication includes communications of respective signals (such as a probe request, probe response, an Authentication signal, an Association signal, and a 4-way handshake, etc.). In the course of these communications, the CPU 32 sends the SSID "networkap" and the password "XXX" received in S515 to the AP 6. The CPU 32 is not aware of the authentication scheme "Shared Key" and the encryption scheme "AES" of the AP 6 at the time when the second connection establishing communication started, however, it can acquire the authentication scheme and the encryption scheme of the AP 6 in the course of the second connection establishing communication. When the authentication of the printer 10 (i.e., the authentication of the password "XXX") succeeds in the AP 6, the CPU 32 establishes the Wi-Fi connection with the AP 6 and causes the printer 10 to participate in the normal AP NW as the child station. Further, the CPU 32 receives the IP address of the printer 10 in the normal AP NW from the AP 6 after having established the Wi-Fi connection with the AP 6, and stores this IP address in the AP profile storing area 42.

In S535, the CPU 32 stops the SoftAP activated in S505. As a result, the SoftAP NW disappears.

In S540, the CPU 32 stores an AP profile that is identical to the AP profile 150 in the AP profile storing area 42 in the memory 34. As a result, the printer 10 stops operating in the setting mode, and operates in the normal mode (NO to S500).

In S545, the CPU 32 monitors a G/O activating operation by the user for activating the printer 10 as the G/O. The CPU 32 proceeds to S550 when the G/O activating operation is performed (YES to S545), and returns to S500 when the G/O activating operation is not performed (NO to S545).

In S550, the CPU 32 shifts the printer 10 to being the G/O of the WFD scheme, and creates the WFD NW in which the printer 10 operates as the parent station. At this stage, only the printer 10 belongs to the WFD NW as the parent station. The CPU 32 determines respective setting values to be employed by the printer 10 operating as the G/O With reference to FIG. 3, the respective setting values will be described. The CPU 32 determines the G/O profile, which is the wireless setting information that should be used in the WFD NW. The CPU 32 determines an SSID for identifying the WFD NW by generating a random letter string each time the printer 10 is activated as the G/O. Since the SSID, which is a random letter string, is determined, this SSID differs from the SSID "Setupprinter10" for identifying the SoftAP NW. In a variant, the CPU 32 may determine a predetermined letter string different from the SSID "Setupprinter10" as the SSID for identifying the WFD NW. The CPU 32 determines a predetermined authentication scheme "WPA2-PSK" and an encryption scheme "TKIP" as security information that should be used in the WFD NW. This security information has a higher security level than the authentication scheme "OPEN" and the encryption scheme "NONE" used in the SoftAP NW. In a variant, the authentication scheme of the WFD NW may be "WPA-PSK", and the encryption scheme of the WFD NW may be "AES". In this variant as well, the security information of the WFD NW has a higher security level than the security information of the SoftAP NW. Further, the CPU 32 generates a password for the authentication and encryption by generating a random letter string each time the printer 10 is activated as the G/O.

Further, the CPU 32 selects one numerical value from a predetermined numerical range (e.g., from "192.168.1.0" to "192.168.1.100") to determine the IP address of the printer 10 in the WFD NW. Here, since the aforementioned numerical range does not include the IP address "192.168.0.1" of the printer 10 in the SoftAP NW, the IP address of the printer 10 in the WFD NW differs from the IP address "192.168.0.1" of the printer 10 in the SoftAP NW. In a variant, the CPU 32 may determine a predetermined value different from the IP address "192.168.0.1" as the IP address of the printer 10 in the WFD NW. Further, the CPU 32 opens a plurality of communication ports identified by a plurality of port numbers. For example, the CPU 32 may open port numbers "22", "80", and "443". The port number "22" is a communication port for executing communication according to SNMP (abbreviation of Simple Network Management Protocol). The port number "80" is a communication port for executing communication according to HTTP (abbreviation of Hyper Text Transfer Protocol). Further, the CPU 32 determines "4" as an upper limit of a number of child stations that can participate in the WFD NW.

In S555, the CPU 32 stores the G/O profile determined in S550 (i.e., the SSID, the authentication scheme "WPA2-PSK", the encryption scheme "TKIP", the password, and the IP address) in the G/O profile storing area 44 in the memory 34. As above, in this embodiment, the CPU 32 determines the G/O profile for each G/O activation, and stores the same in the G/O profile storing area 44. However, in a variant, the CPU 32 may determine the G/O profile each time the G/O is stopped, and may store the same in the G/O profile storing area 44.

In S560, the CPU 32 executes a third connection establishing communication for establishing a wireless connection according to the WFD scheme (which is hereafter termed "WFD connection") with the PC 8. The third connection establishing communication includes receiving a probe request from the PC 8, and sending a probe response to the PC 8. Here, the CPU 32 writes the SSID determined in S550 within the probe response. Due to this, the PC 8 can be notified of the fact that the printer 10 is operating as the G/O of the WFD NW identified by the SSID. The CPU 32 further writes "1" in the P2P GroupOwner bit in the IE included in the probe response. Due to this, the PC 8 can be notified that the WFD connection according to the WFD scheme should be established. The third connection establishing communication further includes communications of respective signals (such as a Provision Discovery signal, an Authentication signal, an Association signal, a WPS (abbreviation of Wi-Fi Protected Setup) Exchange, and a 4-way handshake, etc.). In the course of these communications, the CPU 32 sends the password determined in S550 to the PC 8 upon executing the WPS Exchange. Further, in the course of the communications of the respective signals as above, it receives the SSID and the password from the PC 8. When the authentication of the PC 8 (i.e., the password authentication) succeeds, the CPU 32 establishes the WFD connection with the PC 8 and allows the PC 8 to participate as a child station in the WFD NW. As a result, the CPU 32 can execute communication of various types of data (e.g., receiving print data representing an image of a print target) with the PC 8 using the WFD NW.

(Processes Executed by Devices 10, 100, 8; FIGS. 4 to 8)

Next, processes to be realized by the processes of FIG. 2 will be described with reference to FIGS. 4 to 8. Hereinbelow, for easier understanding, the description regarding the processes executed by the CPUs 32, 132 of the devices 10, 100 according to the programs 38, 138, 140 will be described with the devices (that is, the printer 10 and the mobile terminal 100) as the subject of the action instead of clearly indicating the CPUs as the subject of the action. Further, all communications hereinbelow are executed through the Wi-Fi I/F 16 (or 116), and as such, the clear indication of the communication being executed "through the Wi-Fi I/F 16 (or 116)" will be omitted.

Figure 4:
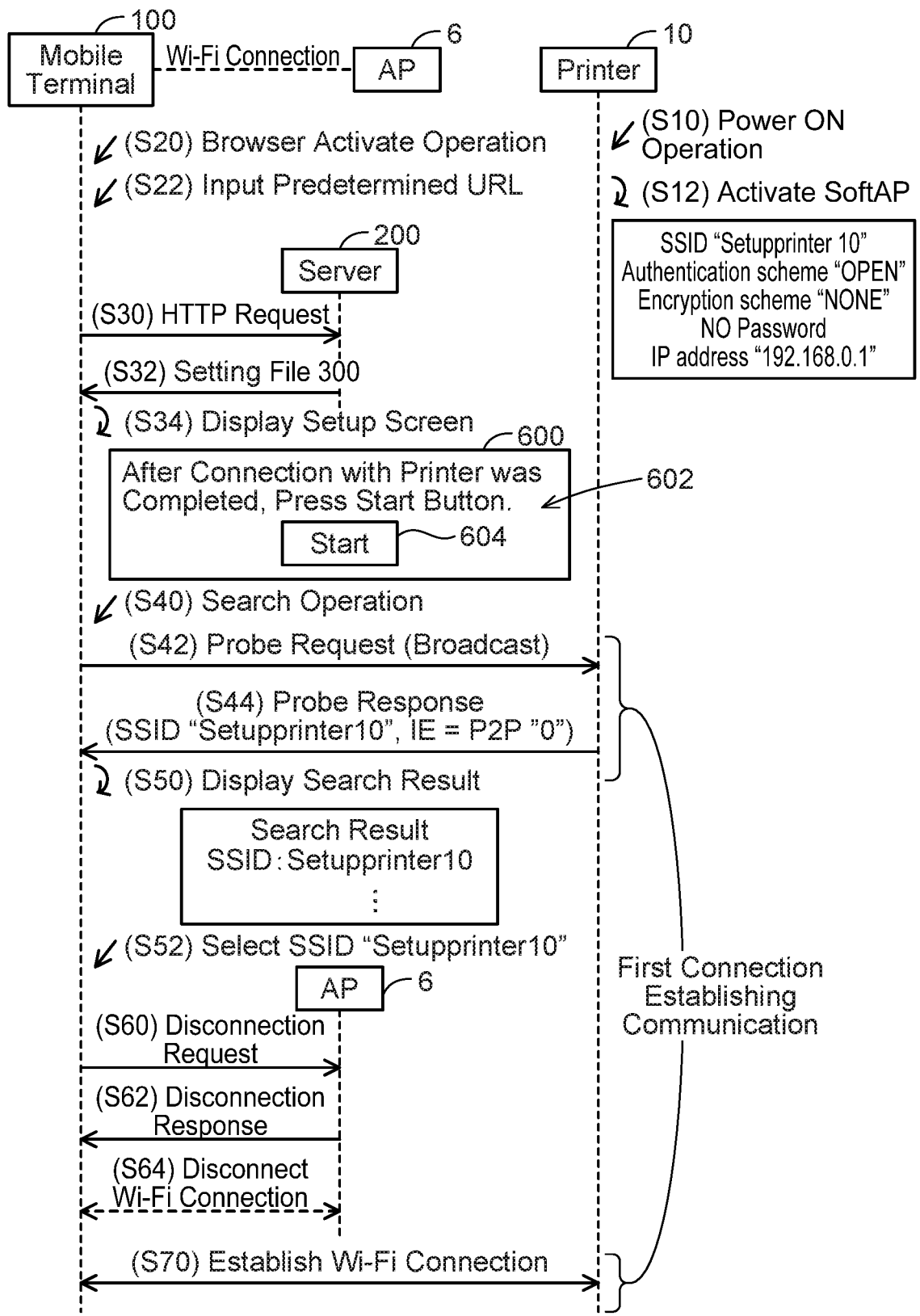
FIG. 4 shows a sequence diagram showing processes by which the printer operating as the SoftAP establishes a Wi-Fi connection with a mobile terminal.

(Process to Establish Wi-Fi Connection According to SoftAP; FIG. 4)

Firstly, with reference to FIG. 4, a process to establish a Wi-Fi connection between the printer 10 and the mobile terminal 100 according to the SoftAP will be described.

In S10, when the user performs an operation to turn on power of the printer 10, the power of the printer 10 is turned on. In this case, the printer 10 does not store any AP profile in the AP profile storing area 42 of the memory 34, so it determines to operate in the setting mode (YES to S500 in FIG. 2). As a result, in S12, the printer 10 automatically activates the SoftAP to form a SoftAP NW, and starts operating as a parent station of the SoftAP NW (i.e., as the SoftAP) (S505). Since the SoftAP is automatically activated according to the operation to turn the power on, the user does not have to perform operations for activating the SoftAP after having performed the operation to turn the power on, as a result of which user's convenience can be improved.

In S20, the user performs an operation for browser activation on the mobile terminal 100 to activate the browser program 140. In this case, the mobile terminal 100 displays a home screen on the display unit 114 according to the browser program 140. For example, a user's manual shipped with the printer 10 describes a URL (abbreviation of Uniform Resource Locator) indicating a location of the server 200. In S22, the user inputs this URL to the mobile terminal 100. In S30, the mobile terminal 100 sends an HTTP request according to the browser program 140 and designating the URL of the server 200 inputted in S30 as destination. As a result, in S32, the mobile terminal 100 receives the setting file 300 from the server 200.

The respective processes as below to be executed by the mobile terminal 100 include processes realized by the browser program 140 executing the setting file 300 (e.g., S34), and processes realized by the OS program 138 without using the browser program 140 (e.g., S42). Hereinbelow, the former processes will be described as "according to the browser program 140", and the latter processes will be described as "according to the OS program 138".

Figure 6:
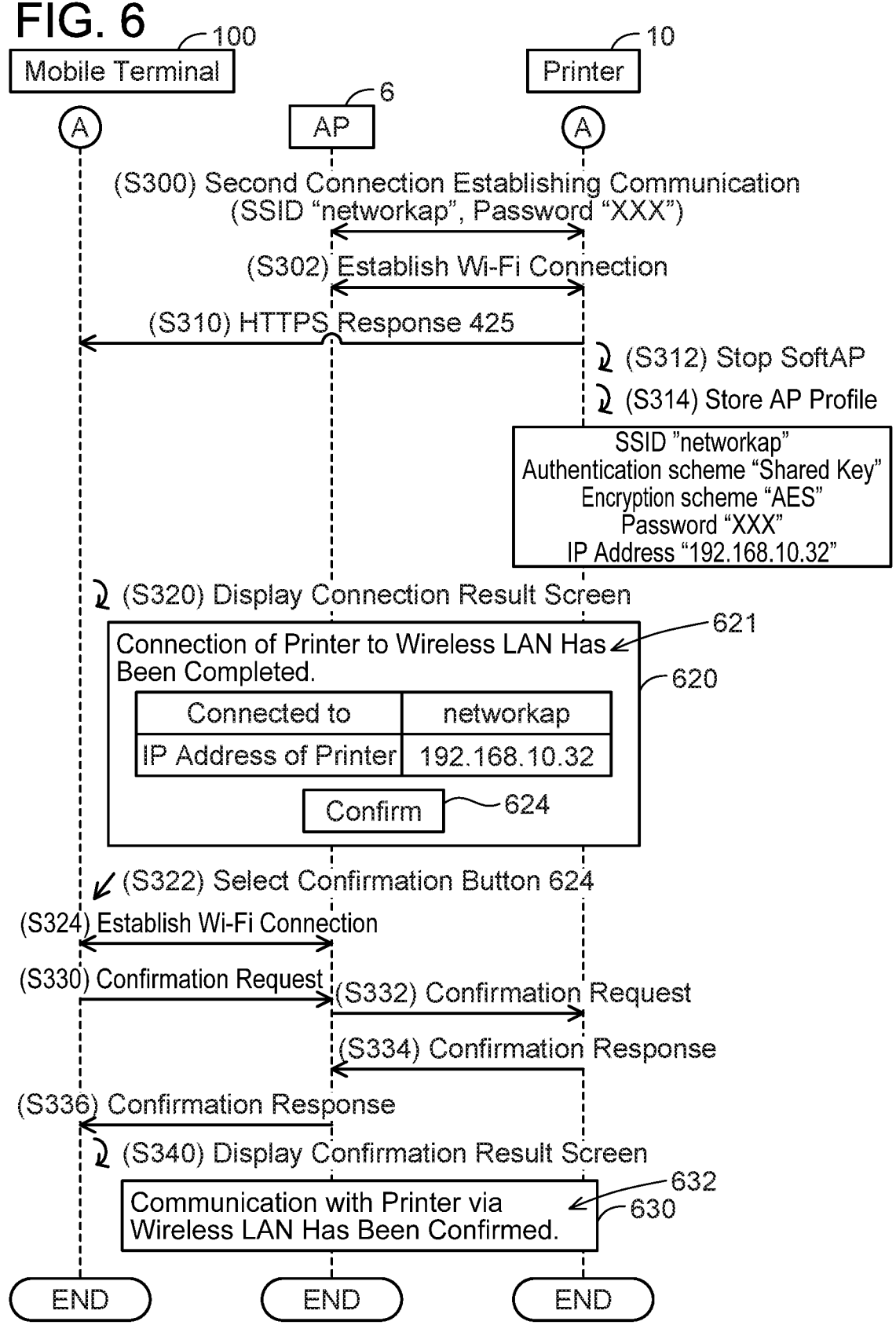
FIG. 6 shows a sequence diagram that is a continuation of FIG. 5, and shows the sequence diagram showing processes by which the printer establishes a Wi-Fi connection with an AP.

FIG. 6 shows an example of commands in the setting file 300. The setting file 300 includes first to seventh commands cmd1 to cmd7, and each of these commands cmd1 to cmd7includes various other commands 500, 502, and the like. Firstly, in S34, the mobile terminal 100 displays a setup screen 600 on the display unit 114 according to the command 500 in the first command cmd1. The setup screen 600 includes an establishment message 602 prompting to establish a Wi-Fi connection between the mobile terminal 100 and the printer 10, and a start button 604 to be selected after establishing the Wi-Fi connection.

In S40, the user firstly performs a search operation on the mobile terminal 100 for searching a connectable printer 10 existing around the mobile terminal 100 according to the establishment message 602. In this case, in S42, the mobile terminal 100 broadcasts a Probe request according to the OS program 138. As a result, in S44, the mobile terminal 100 receives a Probe response including an SSID "Setupprinter10" from the printer 10. This probe request further includes the IE, of which P2P GroupOwner bit describes "0".

In S50, the mobile terminal 100 displays a search result including the SSID "Setupprinter10" included in the Probe response on the display unit 114 according to the OS program 138. In a case where the mobile terminal 100 receives a Probe response from a device different from the printer 10 (e.g., the AP 6, etc.), this search result further includes an SSID in this Probe response as well. Here, the SSID "Setupprinter10" of a SoftAP NW to be formed by the printer 10 includes a letter string indicating a setup for establishing the Wi-Fi connection between the printer 10 and the AP 6 (e.g., "Setup") and a letter string unique to the printer 10 (e.g., "printr10"). Thus, the user can easily find the SSID "Setupprinter10" from among the search results, as a result of which the SSID "Setupprinter10" is selected in S52.

Next, the mobile terminal 100 sends a disconnection request to the AP 6 in S60 according to the OS program 138, and in S62, it receives a disconnection response from the AP 6, as a result of which the Wi-Fi connection with the AP 6 is disconnected in S64. The mobile terminal 100 cannot establish the Wi-Fi connection with the printer 10 while maintaining a state in which the Wi-Fi connection with the AP 6 is connected. Due to this, the mobile terminal 100 disconnects the Wi-Fi connection with the AP 6 in S60 to S64.

In S70, the mobile terminal 100 establishes the Wi-Fi connection with the printer 10 according to the OS program 138. Specifically, the mobile terminal 100 sends a Probe request with the SSID "Setupprinter10" selected in S52 as destination, that is, with the printer 10 as the destination, and further executes communication of respective signals (such as an Authentication signal, an Association signal, and a 4-way handshake) with the printer 10. The SoftAP NW employs an authentication scheme "OPEN" and an encryption scheme "NONE", and authentication and encryption communications are not executed in the printer 10, so the mobile terminal 100 can easily establish the Wi-Fi connection with the printer 10.

When this is explained from a viewpoint on a printer 10 side, S42, S44, and S70 are the first connection establishing communication executed in S510 of FIG. 2. The printer 10 executes the first connection establishing communication with the mobile terminal 100 to cause the mobile terminal 100 to participate in the SoftAP NW as the child station.

Figure 5:
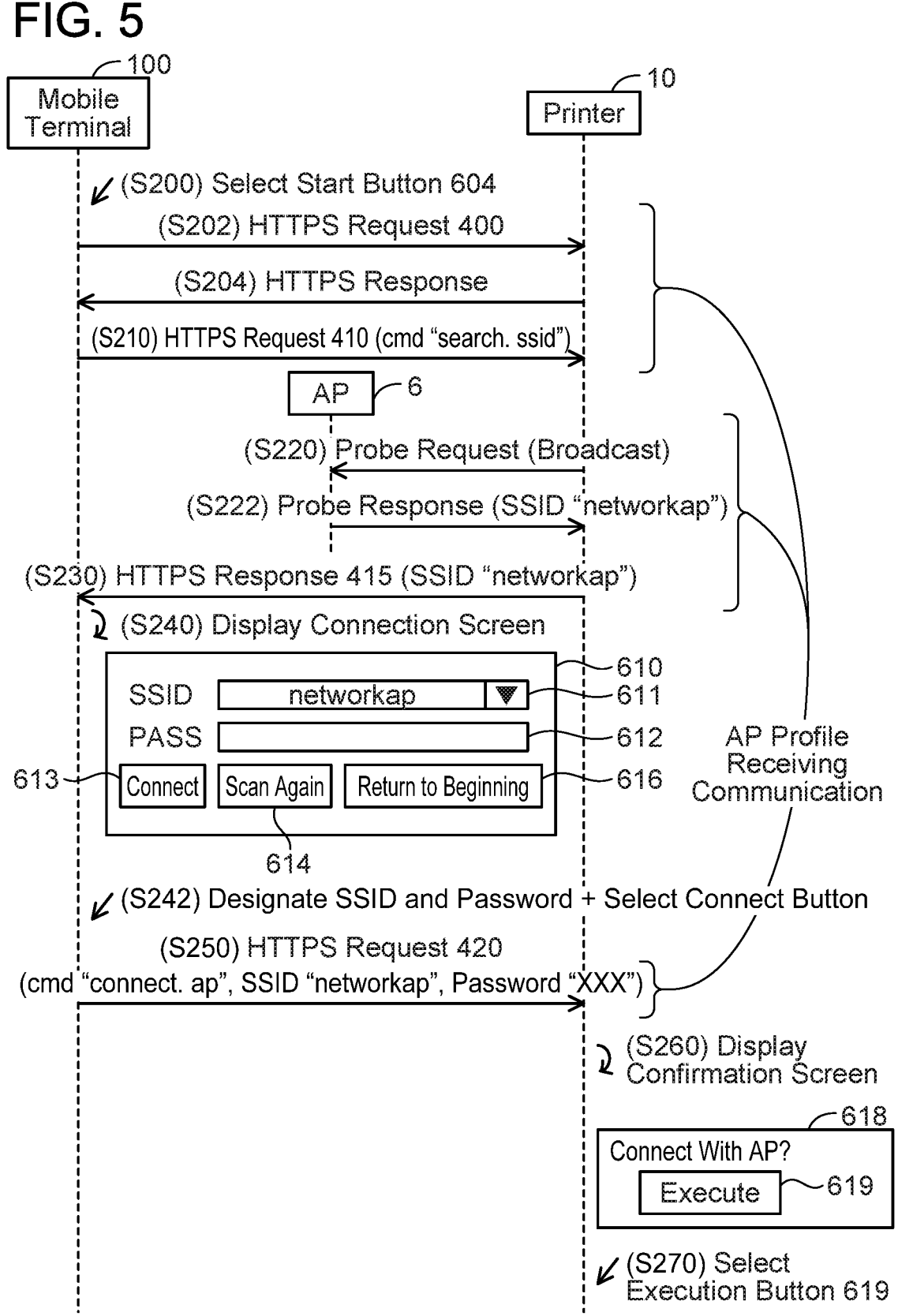
FIG. 5 shows a sequence diagram that is a continuation of FIG. 4, and shows the sequence diagram showing processes by which the printer receives an AP profile from the mobile terminal.

(Process of Sending Normal AP NW SSID, etc. to Printer 10; FIG. 5)

Next, with reference to FIG. 5, a process for the mobile terminal 100 to send an SSID "networkap" and a password "XXX" of the normal AP NW to the printer 10 will be described. From FIG. 5 and thereafter, almost all the processes executed by the mobile terminal 100 are processes realized by the browser program 140 executing the setting file 300. Due to this, the description of "according to the browser program 140" will be omitted, and "according to the OS program 138" will be indicated in the description only for processes realized by the OS program 138 without using the browser program 140.

After the Wi-Fi connection is established between the mobile terminal 100 and the printer 10 in S70 of FIG. 4, the user selects the start button 604 (see S34 in FIG. 4) in the setup screen 600 in S200 of FIG. 5. When the start button 604 is selected, the mobile terminal 100 calls the second command cmd2 according to the command 502 (see FIG. 7) in the first command cmd1 included in the setting file 300. The second command cmd2 includes a preset IP address 504 of the printer 10 (i.e., "192.168.0.1"). Due to this, the mobile terminal 100 can execute communication to be described later with the printer 10 using the IP address 504. The user does not need to input the IP address 504 of the printer 10, so convenience of the user is improved.

Figure 7:
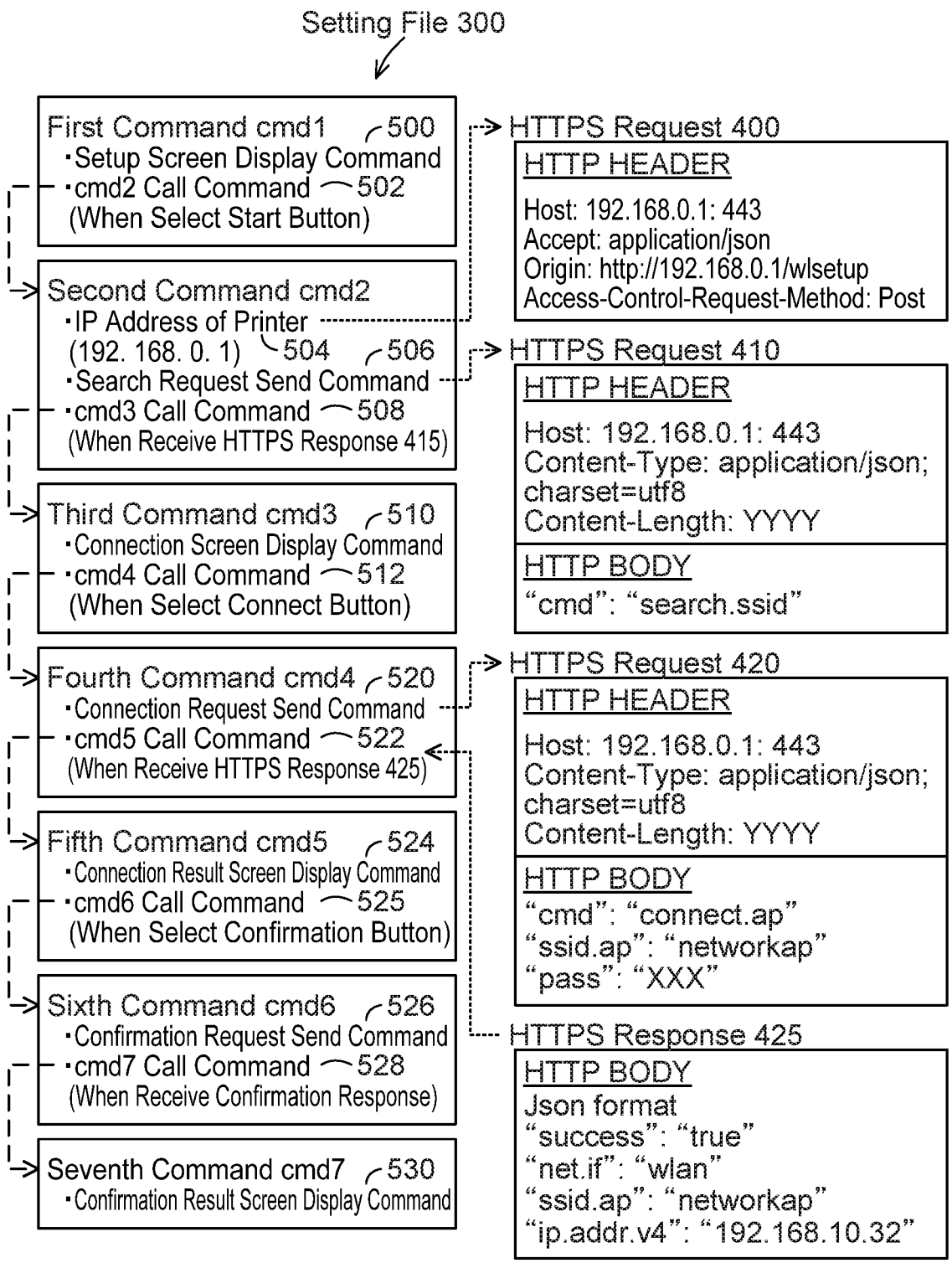
FIG. 7 shows an example of a setting file, HTTPS requests, and HTTPS responses.

Since the second command cmd2 includes the IP address 504 of the printer 10, the mobile terminal 100 can recognize that a communication partner according to the browser program 140 should be changed from the server 200 (see S30, S32 of FIG. 4) to the printer 10. The mobile terminal 100 executes a so-called cross domain communication to change the communication partner. Specifically, in S202, the mobile terminal 100 sends an HTTPS request 400 including the IP address 504 as destination to the printer 10. As shown in FIG. 7, the HTTPS request 400 includes a cross domain request for changing the communication partner from the server 200 to the printer 10 (i.e., "Access-Control-Request-Method: Post"). Further, in S204, the mobile terminal 100 receives an HTTPS response from the printer 10. Due to this, the cross domain is completed, and the mobile terminal 100 can suitably execute the communication with the printer 10 hereafter.

Next, in S210, the mobile terminal 100 sends an HTTPS request 410 including the IP address 504 as destination to the printer 10 according to a command 506 in the second command cmd2. As shown in FIG. 7, the HTTPS request 410 includes a search command for causing the printer 10 to execute search of one or more APs existing around the printer 10 (i.e., ""cmd": "search. ssid"").

When this is explained from the viewpoint on the printer 10 side, S202 to S210 are a part of the AP profile receiving communication executed in S515 of FIG. 2. That is, in the AP profile receiving communication, the printer 10 receives the HTTPS request 400 including the cross domain request from the mobile terminal 100 (S202), sends the HTTPS response to the mobile terminal 100 (S204), and receives the HTTPS request 410 including the search command from the mobile terminal 100 (S210).

In S220, the printer 10 broadcasts a Probe request for searching the APs according to the search command in the HTTPS request 410. As a result, in S222, the printer 10 receives a Probe response including an SSID "networkap" from the AP 6.

In S230, the mobile terminal 100 receives an HTTPS response 415 from the printer 10, and this HTTPS response 415 includes the SSID "networkap" of the AP 6 that was found as a result of the aforementioned search. In a case where the printer 10 receives a Probe response from a device different from the AP 6, the HTTPS response 415 further includes an SSID in this Probe response as well. That is, the HTTPS response 415 includes one or more SSIDs including the SSID "networkap" of the AP 6. When the HTTPS response 415 is received from the printer 10, the mobile terminal 100 calls the third command cmd3 according to a command 508 in the second command cmd2 included in the setting file 300 (see FIG. 7).

When this is explained from the viewpoint on the printer 10 side, S220 to S230 are a part of the AP profile receiving communication executed in S515 of FIG. 2. That is, in the AP profile receiving communication, the printer 10 broadcasts the probe request (S220), receives the probe response including the SSID "networkap" of the AP 6 from the AP 6 (S222), and sends the HTTPS response 415 including the SSID "networkap" of the AP 6 to the mobile terminal 100 (S230).

In S240, the mobile terminal 100 displays a connection screen 610 on the display unit 114 according to a command 510 in the third command cmd3. The connection screen 610 includes designation areas 611, 612 for designating wireless setting information for establishing the Wi-Fi connection between the printer 10 and the AP 6, a connection button 613 to be selected after the designation of the wireless setting information, a "scan again" button 614, and a return button 616. The designation areas 611, 612 include an SSID designation area 611 and a password designation area 612. The SSID designation area 611 is an area for designating one SSID from among the one or more SSIDs included in the HTTPS response 415. The password designation area 612 is an area for designating the password. The "scan again" button 614 is a button for causing the printer 10 to execute the search for APs again. When the "scan again" button 614 is to be selected by the user, the mobile terminal 100 returns to 5210. Further, when the return button 616 is to be selected by the user, the mobile terminal 100 returns to S34 of FIG. 4.

Since the user had already performed the operation for establishing the Wi-Fi connection between the mobile terminal 100 and the AP 6, the user already knows the SSID "networkap" of the AP 6 and the password "XXX". Due to this, in S242, the user can designate the SSID "networkap" of the AP 6 from among the one or more SSIDs in the SSID designation area 611, and also can normally designate the password "XXX" in the password designation area 612. In a variant, the Wi-Fi connection may not be established between the mobile terminal 100 and the AP 6. Further, in yet another variant, if the authentication scheme used by the AP 6 is "OPEN" and the encryption scheme thereof is "NONE", no password may be designated. The user selects the connection button 613 after the designation of the SSID "networkap" and the password. If the connection button 613 is selected, the mobile terminal 100 calls the fourth command cmd4 according to a command 512 in the third command cmd3 included in the setting file 300.

In S250, the mobile terminal 100 sends an HTTPS request 420 including the IP address 504 as destination to the printer 10 according to the command 520 in the fourth command cmd4. As shown in FIG. 7, the HTTPS request 420 includes the designated SSID "networkap", the designated password "XXX", and a connection command for causing the printer 10 to establish the Wi-Fi connection with the AP 6 (i.e., ""cmd": "connect.ap"").

When this is explained from the viewpoint on the printer 10 side, S250 is a part of the AP profile receiving communication executed in S515 of FIG. 2. That is, in the AP profile receiving communication, the printer 10 receives the HTTPS request 420 including the designated SSID, the designated password, and the connection command from the mobile terminal 100.

In S260, the printer 10 displays a confirmation screen 618 on the display unit 14 when the HTTPS request 420 is received from the mobile terminal 100 (S520). The confirmation screen 618 includes an execution button 619, which is a trigger of participation in the normal AP NW. In S270, the user selects the execution button 619 in the confirmation screen 618 (YES to S525).

(Processes of Printer 10 Establishing Wi-Fi Connection With AP 6; FIG. 6)

Next, with reference to FIG. 5, processes for the printer 10 to establish the Wi-Fi connection with the AP 6 will be described.

In S300, the printer 10 uses the SSID "networkap" and the password "XXX" in the HTTPS request 420 according to the connection command in the HTTPS request 420 to execute a second connection establishing communication with the AP 6 to establish the Wi-Fi connection (S530). Specifically, the printer 10 executes communication of respective signals (such as an Authentication signal, an Association signal, and a 4-way handshake) with the AP 6. In this process, the printer 10 sends the SSID "networkap" and the password "XXX" to the AP 6. The printer 10 is not aware of the authentication scheme and the encryption scheme of the AP 6 at the time when the HTTPS request 420 is received, however, it can acquire the authentication scheme and the encryption scheme of the AP 6 upon executing the second connection establishing communication with the AP 6. When the authentication of the printer 10 (i.e., the authentication of the password "XXX") succeeds in the AP 6, the Wi-Fi connection is established between the printer 10 and the AP 6 in S302. When the Wi-Fi connection is established, the printer 10 receives an IP address "192.168.10.32" of the printer 10 in the normal AP NW from the AP 6. This IP address "192.168.10.32" differs from the IP address "192.168.0.1" of the printer 10 included in the setting file 300 (see reference sign 504 in FIG. 7).

In S310, the printer 10 sends an HTTPS response 425 to the mobile terminal 100. As shown in FIG. 7, the HTTPS response 425 includes information indicating that the establishment of the Wi-Fi connection with the AP 6 has succeeded (i.e., ""success":"true""), information indicating the Wi-Fi I/F 16 that had established the Wi-Fi connection (i.e., ""net.if":"wlan""), the SSID "networkap" of the AP 6, and the IP address "192.168.10.32" of the printer 10 in the normal AP NW. Further, in S312, the printer 10 stops the SoftAP (S535). As a result, the SoftAP NW disappears, and the Wi-Fi connection between the mobile terminal 100 and the printer 10 is disconnected.

In S314, the printer 10 stores the AP profile 150 in the AP profile storing area 42 of the memory 34 (S540). As a result, the printer 10 stops operating in the setting mode, and starts operating in the normal mode (NO to S500).

When the HTTPS response 425 is received in S310, the mobile terminal 100 calls the fifth command cmd5 according to a command 522 (see FIG. 7) in the fourth command cmd4 included in the setting file 300. In S320, the mobile terminal 100 displays a connection result screen 620 on the display unit 114 according to a command 524 in the fifth command cmd5. The connection result screen 620 includes a success message 621 indicating that the establishment of the Wi-Fi connection between the printer 10 and the AP 6 has succeeded, the SSID "networkap" included in the HTTPS response 425, the IP address "192.168.10.32" of the printer 10 included in the HTTPS response 425, and a confirmation button 624. The confirmation button 624 is a button for executing confirmation communication with the printer 10 through the AP 6. In S322, the user selects the confirmation button 624. In this case, the mobile terminal 100 calls the sixth command cmd6 according to a command 525 (see FIG. 7) in the fifth command cmd5 in the setting file 300.

In S324, the mobile terminal 100 instructs the OS program 138 to execute confirmation communication according to the command 526 in the sixth command cmd6. Due to this, the mobile terminal 100 establishes the Wi-Fi connection with the AP 6 again according to the OS program 138 and by using the AP profile 150 in the memory 134.

Next, in S330 and S332, the mobile terminal 100, sends a confirmation request, which includes the IP address "192.168.10.32" included in the HTTPS response 425 as destination, through the AP 6 to the printer 10 according to a command 526 in the sixth command cmd6. As a result, in S334 and S336, the mobile terminal 100 receives a confirmation response through the AP 6 from the printer 10. When the confirmation response is received, the mobile terminal 100 calls the seventh command cmd7 according to a command 528 (see FIG. 7) in the sixth command cmd6 included in the setting file 300.

In S340, the mobile terminal 100 displays a confirmation result screen 630 on the display unit 114 according to a command 530 in the seventh command cmd7. The confirmation result screen 630 includes a success message 632 indicating that the communication with the printer 10 through the AP 6 has succeeded. Due to this, the user can acknowledge that both the mobile terminal 100 and the printer 10 are participating in the same normal AP NW.

(Processes to Establish WFD Connection; FIG. 8)

Next, processes for the printer 10 operating as the G/O of the WFD NW to establish the WFD connection with the PC 8 will be described with reference to FIG. 8. At an initial state of FIG. 8, the printer 10 operates in the normal mode after the processes of FIGS. 4 to 6 (NO to S500 in FIG. 2).

In S400, the user performs the G/O activating operation to the printer 10 for activating the printer 10 as the G/O of the WFD NW (YES to S545). In this case, in S402, the printer 10 activates the G/O and forms the WFD NW, and determines the G/O profile (S550). The G/O profile includes an SSID "abcde", a password "YYY", the authentication scheme "WPA2-PSK", the encryption scheme "TKIP", and an IP address "192.168.1.1". In S404, the printer 10 stores the determined G/O profile in the G/O profile storing area 44 of the memory 34 (S555).

In S410, the user performs a WFD connecting operation to the PC 8 for establishing the WFD connection between the printer 10 and the PC 8. Due to this, the printer 10 executes the third connection establishing communication with the PC 8 (S560). Specifically, the printer 10 receives the probe request that was broadcasted from the PC 8 in S420, and sends the probe response including the SSID "abcde" to the PC 8 in S430. This probe response includes the IE, of which P2P GroupOwner bit describes "1".

In S440, the printer 10 executes the communications of the respective signals (such as the Provision Discovery signal, the Authentication signal, the Association signal, the WPS Exchange, and the 4-way handshake, etc.) with the PC 8. In the course of these communications, the printer 10 sends the password "YYY" to the PC 8, after which it receives the SSID "abcde" and the password "YYY" from the PC 8, and executes the authentication of the PC 8 (i.e., the authentication of the password "YYY"). When the authentication succeeds, the printer 10 establishes the WFD connection with the PC 8 in S442 and allows the PC 8 to participate as the child station in the WFD NW.

The printer 10 can use the WFD NW to receive the print data representing the image of the print target from the PC 8, for example, and it can execute printing according to the print data.

(Effects of Embodiment)

According to the present embodiment, the printer 10 displays the confirmation screen 618 for accepting the operation on the execution button 619 (S260 of FIG. 5) when the Wi-Fi connection is established between the mobile terminal 100 and the printer 10 operating as the SoftAP (S70 of FIG. 4). Further, when the operation on the execution button 619 is accepted (S270), the printer 10 establishes the Wi-Fi connection between the printer 10 and the AP 6 and participates as the child station in the normal AP NW (S302 of FIG. 6). A third party who is not the user of the printer 10 would have difficulty in approaching close to the printer 10 to select the execution button 619. Thus, an occasion in which the third party establishes a Wi-Fi connection in the printer 10 with an AP that the user of the printer 10 does not intend can be prevented.

Further, a configuration of a comparative example, in which the printer 10 determines an IP address that is identical to the IP address "192.168.0.1" of the printer 10 in the SoftAP NW as the IP address of the printer 10 in the WFD NW will be assumed. Since the IP address "192.168.0.1" is written in the setting file 300 in the server 200, the third party, who is not the user of the printer 10, may acknowledge the IP address "192.168.0.1". Further, if the third party causes his device to participate in the WFD NW and sends the AP profile that designates the IP address "192.168.0.1" as the destination to the printer 10, the printer 10 would receive this AP profile as a legitimate process. As a result, the printer 10 may use this AP profile to establish a Wi-Fi connection with an AP that the user of the printer 10 does not intend to do so. With respect to this, in this embodiment, the IP address "192.168.1.1", which is different from the IP address "192.168.0.1", is determined as the IP address of the printer 10 in the WFD NW. Thus, even if the third party causes his device to participate in the WFD NW and attempts to send the AP profile that designates the IP address "192.168.0.1" as the destination to the printer 10, the printer 10 does not receive this AP profile. As a result, the printer 10 does not establish the Wi-Fi connection with an AP using this AP profile. Due to this, the printer 10 can be prevented from establishing the Wi-Fi connection by the third party with the AP that the user of the printer 10 does not intend to.

Further, as shown in FIG. 3, many differences exist between the setting values of the SoftAP NW and the setting values of the WFD NW. The security information of the WFD NW (i.e., the "WPA2-PSK" and the "TKIP") have a higher security than the security information of the SoftAP NW (i.e., the "Open" and "None"). The printer 10 executes the communication of data with high confidentiality, such as the print data, with the PC 8 using the WFD NW. In this embodiment, the printer 10 uses the WFD NW having the higher security level to execute the communication with the PC 8, so the data having the high confidentiality is prevented from being acquired by the third party.

Further, in the SoftAP NW, only the communication port identified by the port number "443", that is, the communication port for executing the communications according to HTTPS, is opened. Due to this, the printer 10 will not receive the AP profile even if the third party, who is not the user of the printer 10, sends the AP profile to the printer 10 according to a protocol identified by a port number different from the port number "443" (e.g., HTTP, SNMP, etc.). Due to this, the printer 10 can be protected from the third party's attempt to establish the Wi-Fi connection with the AP that the user of the printer 10 does not intend to.

Further, in the SoftAP NW, the upper limit of the number of the child stations that can participate is "1". Due to this, the third party's device can be prevented from participating in the SoftAP NW by establishing the Wi-Fi connection with the printer 10 during when the user is attempting to establish the Wi-Fi connection with the AP 6 in the printer 10 using the mobile terminal 100 (S200 of FIG. 5 to S302 of FIG. 6). As a result, the printer 10 can be protected from the third party's attempt to establish the Wi-Fi connection with the AP that the user of the printer 10 does not intend to.

(Corresponding Relationships)

The printer 10, the mobile terminal 100, the PC 8, and the AP 6 are respectively an example of a "communication device", a "first external device", a "second external device", and a "target access point". The setting file 300 is an example of "computer-readable instructions". The Wi-Fi connection in S70 of FIG. 4, the Wi-Fi connection in S302 of FIG. 6, and the WFD connection in S442 of FIG. 8 are respectively an example of a "first wireless connection", a "target wireless connection", and a "second wireless connection". The confirmation screen 618 in S260 of FIG. 5 and the operation in S270 of FIG. 5 are respectively an example of a "predetermined screen" and a "trigger operation". The SSID and the password designated in S242 of FIG. 5 are examples of "target wireless setting information". The SSID "Setupprinter10" and the SSID "abcde" are respectively an example of a "first network identifier" and a "second network identifier". The IP address "192.168.0.1" in the AP profile and the IP address "192.168.1.1" in the G/O profile are respectively an example of a "first IP address" and a "second IP address". The authentication scheme "OPEN" and the encryption scheme "NONE" in the AP profile are an example of "first security information". The authentication scheme "WPA2-PSK" and the encryption scheme "TKIP" in the G/O profile are an example of "second security information". The one port opened in the SoftAP and the plurality of ports opened in the WFD NW are respectively an example of "N1 communication ports" and "N2 communication ports". The P2P GroupOwner bit "1" included in the probe response of S430 of FIG. 8 is an example of "enable information".

(Variant 1) In S505 of FIG. 2, the printer 10 may determine the authentication scheme "WPA-PSK" and the encryption scheme "TKIP" or "AES" as the security information used in the SoftAP NW. In this case, the printer 10 determines a password to be used in the SoftAP NW. In this variant, further in S550 of FIG. 2, the printer 10 determines the authentication scheme "WPA2-PSK" and the encryption scheme "TKIP" or "AES" as the security information used in the WFD NW. In this variant as well, the security information of the WFD NW has a higher security level than the security information of the SoftAP NW.

(Variant 2) The security information used in the SoftAP NW may have a higher security level than the security information used in the WFD NW. For example, the authentication scheme "WPA2-PSK" and the encryption scheme "TKIP" or "AES" may be determined as the security information used in the SoftAP NW, and the authentication scheme "WPA-PSK" and the encryption scheme "TKIP" or "AES" may be determined as the security information used in the WFD NW.

(Variant 3) The printer 10 may not display the confirmation screen in S260 of FIG. 5. In this case, the printer 10 participates in the normal AP NW as the child station without accepting the operation of the execution button in the confirmation screen. In this variant as well, the printer 10 determines the IP address of the printer 10 in the WFD NW different from the IP address of the printer 10 in the SoftAP NW, so the printer 10 can be protected from the attempt of the third party, who is not the user of the printer 10, to establish the Wi-Fi connection with the AP that the user does not intend to. In this variant, the "control the display unit to display a predetermined screen" may be omitted.

(Variant 4) Instead of S505 and S510 of FIG. 2, the printer 10 may participate as a child station in a wireless network in which the mobile terminal 100 operates as the SoftAP or the G/O. That is, the "first wireless network" may be a network in which the communication device operates as the parent station, or may be a network in which the communication device operates as a child station.

(Variant 5) The printer 10 may open a plurality of communication ports in the SoftAP NW. For example, the printer 10 may open respective communication ports in SoftAP NW that are same as those communication ports opened in WFD NW. Further, the upper limit of the number of child stations that can participate in the SoftAP NW may be "2" or more, and the upper limit of the number of child stations that can participate in the WFD NW may be less than "4", or may be "5" or more.

(Variant 6) The printer 10 may not create the WFD NW. That is, the printer 10 may not execute S545 to S560 of FIG. 2. In this variant, the respective features related to the "second wireless network" (i.e., the "establish a second wireless connection" and "determine a second IP address") may be omitted.

(Variant 7) In S32 of FIG. 4, the mobile terminal 100 may not receive the setting file 300 from the server 200. For example, the setting file 300 may be stored in the memory 34 of the printer 10 in advance. Further, the mobile terminal 100 may receive the setting file 300 from the printer 10 using the SoftAP NW.

(Variant 8) The "communication device" is not limited to the printer 10, but may be a scanner, a multi-function device having printing function and other functions (e.g., scan function, FAX function, etc.), or may be other devices (e.g., PC, server, etc.).

(Variant 9) In the respective embodiments as above, the processes of FIG. 2, FIGS. 4 to 6, and FIG. 8 are implemented by software (i.e., program), however, at least one of these processes may be implemented by hardware such as a logic circuit.

What is claimed is:

1. A communication device comprising:
   a display unit;
   a Wi-Fi interface;
   a processor; and
   a memory storing computer-readable instructions therein, the computer-readable instructions, when executed by the processor, causing the communication device to:
      under a state where the communication device operates in a first mode for establishing a wireless connection with an access point, establish a first wireless connection with a first external device via the Wi-Fi interface, the first wireless connection with the first external device being established so as to cause the first external device to participate as a child station in a first wireless network in which the communication device operates as a parent station, the first wireless network being identified by a first Service Set Identifier (SSID);
      under the state where the communication device operates in the first mode and in a case where the first wireless connection is established, receive target wireless setting information from the first external device via the Wi-Fi interface by using the first wireless connection, the target wireless setting information being for the communication device to participate as a child station in a target wireless network formed by a target access point different from the first external device, the target wireless setting information including a target SSID;
      under the state where the communication device operates in the first mode and in a case where the first wireless connection is established, control the display unit to display a predetermined screen for accepting a trigger operation, the trigger operation being a trigger of participation in the target wireless network;
      under the state where the communication device operates in the first mode and in a case where the trigger operation is accepted after the predetermined screen has been displayed, establish a target wireless connection with the target access point via the Wi-Fi interface by using the target SSID in the target wireless setting information such that the communication device participates as the child station in the target wireless network; and
      under a state where the communication device operates in a second mode different from the first mode, establish a second wireless connection with a second external device via the Wi-Fi interface so as to cause the second external device to participate as a child station in a second wireless network in which the communication device operates as a parent station, the second wireless network being identified by a second SSID different from the first SSID.

2. The communication device as in claim 1, wherein the computer-readable instructions, when executed by the processor, further cause the communication device to:
   determine a predetermined first IP address as an IP address of the communication device in the first wireless network in which the communication device operates as a parent station; and
   determine a second IP address as an IP address of the communication device in the second wireless network in which the communication device operates as a parent station, the second IP address being different from the first IP address,
   wherein the target wireless network with the target access point is established in a case where:
      the target wireless setting information is received from the first external device via the Wi-Fi interface by using the first wireless network, the target wireless setting information being information sent to the first IP address designated as a destination from the first external device; and
      the trigger operation is accepted after the predetermined screen has been displayed.

3. The communication device as in claim 1, wherein the computer-readable instructions, when executed by the processor, further cause the communication device to:
   determine first security information to be used in the first wireless network; and
   determine second security information to be used in the second wireless network, the second security information having a higher security level than the first security information.

4. The communication device as in claim 1, wherein the computer-readable instructions, when executed by the processor, further cause the communication device to:
   open N1 communication ports in a state where the communication device operates as the parent station of the first wireless network; and
   open N2 communication ports in a state where the communication device operates as the parent station of the second wireless network, N2 being greater than N1.

5. The communication device as in claim 1, wherein
   an upper limit of a number of child stations capable of participating in the first wireless network is one, and
   an upper limit of a number of child stations capable of participating in the second wireless network is two or more.

6. The communication device as in claim 1, wherein the computer-readable instructions, when executed by the processor, further cause the communication device to:
   activate a SoftAP so as to form the first wireless network in which the communication device operates as the parent station;
   in a case where a first probe request is received from the first external device via the Wi-Fi interface after the first wireless network has been formed, send a first probe response to the first external device via the Wi-Fi interface, the first probe response indicating that it is not possible to execute wireless communication according to a Wi-Fi Direct (registered trademark) scheme;
   shift to a Group Owner of the Wi-Fi Direct scheme so as to form the second wireless network in which the communication device operates as the parent station; and
   in a case where a second probe request is received from the second external device via the Wi-Fi interface after the second wireless network has been formed, send a second probe response, which indicates that it is possible to execute wireless communication according to the Wi-Fi Direct scheme, to the second external device via the Wi-Fi interface.

7. The communication device as in claim 1, wherein the computer-readable instructions, when executed by the processor, further cause the communication device to:
  form the first wireless network in which the communication device operates as the parent station in a case where power of the communication device is turned on in a state where the target wireless setting information is not stored in the memory; and
  form the second wireless network in which the communication device operates as the parent station in a case where a predetermined operation for forming the second wireless network is accepted after the power of the communication device has been turned on.

8. A communication device comprising:
  a Wi-Fi interface;
  a processor; and
  a memory storing computer-readable instructions therein, the computer-readable instructions, when executed by the processor, causing the communication device to:
    under a state where the communication device operates in a first mode for establishing a wireless connection with an access point, establish a first wireless connection with a first external device via the Wi-Fi interface so as to cause the first external device to participate as a child station in a first wireless network in which the communication device operates as a parent station, the first wireless network being identified by a first Service Set Identifier (SSID);
    under the state where the communication device operates in the first mode, determine a predetermined first IP address as an IP address of the communication device in the first wireless network in which the communication device operates as a parent station;
    under the state where the communication device operates in the first mode, receive target wireless setting information from the first external device via the Wi-Fi interface by using the first wireless network, the target wireless setting information being information sent to the first IP address designated as a destination from the first external device, the target wireless setting information being for the communication device to participate as a child station in a target wireless network formed by a target access point different from the first external device, the target wireless setting information including a target SSID;
    under the state where the communication device operates in the first mode and in a case where the target wireless setting information in which the first IP address is designated as the destination is received, establish a target wireless connection with the target access point via the Wi-Fi interface by using the target SSID in the target wireless setting information such that the communication device participates as a child station in the target wireless network;
    under a state where the communication device operates in a second mode different from the first mode, establish a second wireless connection with a second external device via the Wi-Fi interface so as to cause the second external device to participate as a child station in a second wireless network in which the communication device operates as a parent station, the second wireless network being identified by a second SSID different from the first SSID; and
    under the state where the communication device operates in the second mode, determine a second IP address as an IP address of the communication device in the second wireless network in which the communication device operates as a parent station, the second IP address being different from the first IP address.

9. The communication device as in claim 8, wherein the first external device is configured to:
  receive a computer program in which the first IP address is included from a server via the Internet; and
  send, by using the computer program, the target wireless setting information to the communication device by using the first IP address as the destination,
  wherein the computer-readable instructions, when executed by the processor, further cause the communication device to:
    receive a Cross-Domain request from the first external device via the Wi-Fi interface by using the first wireless network, the Cross-Domain request being for changing a communication partner of the first external device from the server to the communication device,
  wherein the target wireless setting information is received from the first external device after the Cross-Domain request has been received.

10. The communication device as in claim 8, wherein the computer-readable instructions, when executed by the processor, further cause the communication device to:
  determine first security information to be used in the first wireless network; and
  determine second security information to be used in the second wireless network, the second security information having a higher security level than the first security information.

11. The communication device as in claim 8, wherein the computer-readable instructions, when executed by the processor, further cause the communication device to:
  open N1 communication ports in a state where the communication device operates as the parent station of the first wireless network; and
  open N2 communication ports in a state where the communication device operates as the parent station of the second wireless network, N2 being greater than N1.

12. The communication device as in claim 8, wherein
  an upper limit of a number of child stations capable of participating in the first wireless network is one, and
  an upper limit of a number of child stations capable of participating in the second wireless network is two or more.

13. The communication device as in claim 8, wherein the computer-readable instructions, when executed by the processor, further cause the communication device to:
  activate a SoftAP so as to form the first wireless network in which the communication device operates as the parent station;
  in a case where a first probe request is received from the first external device via the Wi-Fi interface after the first wireless network has been formed, send a first probe response to the first external device via the Wi-Fi interface, the first probe response indicating that it is not possible to execute a wireless communication according to a Wi-Fi Direct (registered trademark) scheme;

shift to a Group Owner of the Wi-Fi Direct scheme so as to form the second wireless network in which the communication device operates as the parent station; and in a case where a second probe request is received from the second external device via the Wi-Fi interface after the second wireless network has been formed, send a second probe response, which indicates that it is possible to execute wireless communication according to the Wi-Fi Direct scheme, to the second external device via the Wi-Fi interface.

14. The communication device as in claim 8, wherein the computer-readable instructions, when executed by the processor, further cause the communication device to:

form the first wireless network in which the communication device operates as the parent station in a case where power of the communication device is turned on in a state where the target wireless setting information is not stored in the memory; and form the second wireless network in which the communication device operates as the parent station in a case where a predetermined operation for forming the second wireless network is accepted after the power of the communication device has been turned on.

15. A non-transitory computer-readable recording medium storing computer-readable instructions for a communication device, wherein the computer-readable instructions, when executed by a processor of the communication device, cause the communication device to:

under a state where the communication device operates in a first mode for establishing a wireless connection with an access point, establish a first wireless connection with a first external device via a Wi-Fi interface of the communication device, the first wireless connection with the first external device being established so as to cause the first external device to participate as a child station in a first wireless network in which the communication device operates as a parent station, the first wireless network being identified by a first Service Set Identifier (SSID);

under the state where the communication device operates in the first mode and in a case where the first wireless connection is established, receive target wireless setting information from the first external device via the Wi-Fi interface by using the first wireless connection, the target wireless setting information being for the communication device to participate as a child station in a target wireless network formed by a target access point different from the first external device, the target wireless setting information including a target SSID;

under the state where the communication device operates in the first mode and in a case where the first wireless connection is established, control a display unit of the communication device to display a predetermined screen for accepting a trigger operation, the trigger operation being a trigger of participation in the target wireless network;

under the state where the communication device operates in the first mode and in a case where the trigger operation is accepted after the predetermined screen has been displayed, establish a target wireless connection with the target access point via the Wi-Fi interface by using the target SSID in the target wireless setting information such that the communication device participates as the child station in the target wireless network; and under a state where the communication device operates in a second mode different from the first mode, establish a second wireless connection with a second external device via the Wi-Fi interface so as to cause the second external device to participate as a child station in a second wireless network in which the communication device operates as a parent station, the second wireless network being identified by a second SSID different from the first SSID.

* * * * *